Aug. 26, 1969   J. D. LETTER   3,463,653
PROCESS FOR PERMANENTLY ORNAMENTING STONE
Filed Feb. 18, 1965   3 Sheets-Sheet 1

INVENTOR
Joseph D. Letter

BY
Holcombe, Wetherill & Brisebois
ATTORNEYS

Aug. 26, 1969     J. D. LETTER     3,463,653
PROCESS FOR PERMANENTLY ORNAMENTING STONE
Filed Feb. 18, 1965     3 Sheets-Sheet 2

INVENTOR
Joseph D. Letter

BY Holcombe, Wetherill & Brisebois
ATTORNEYS

Aug. 26, 1969  J. D. LETTER  3,463,653
PROCESS FOR PERMANENTLY ORNAMENTING STONE
Filed Feb. 18, 1965  3 Sheets-Sheet 3

INVENTOR
Joseph D. Letter

BY Holcombe, Wetherill & Brisebois
ATTORNEYS

United States Patent Office 3,463,653
Patented Aug. 26, 1969

3,463,653
PROCESS FOR PERMANENTLY ORNAMENTING STONE
Joseph D. Letter, % Granite Marble Coquina Tomoka Estates, U.S. 1, Ormond Beach, Fla. 32074
Continuation-in-part of application Ser. No. 397,826, Sept. 21, 1964. This application Feb. 18, 1965, Ser. No. 437,622
Int. Cl. B44d *1/52;* C23d *5/08;* B41m *1/12*
U.S. Cl. 117—8.5                              1 Claim

ABSTRACT OF THE DISCLOSURE

A method for producing a decorative insert in a stone base is disclosed. A stencil is applied to the stone base and portions of the stencil corresponding to the design are removed. The stone base is abraded to produce impressions corresponding to the design. Portions of the stencil are replaced leaving exposed the outline portions of the design which are further abraded. The outline portions are filled with a composition comprising crushed stone and a synthetic resin which is allowed to set. The stencil is removed and the remaining portions of the design are filled with a mixture of crushed stone and synthetic resin. After the mixture has set the surface of the stone is finished.

---

This application is a continuation-in-part of my co-pending application Ser. No. 397,826, filed Sept. 21, 1964, now abandoned.

Heretofore, stone, such as granite and marble have been extensively used for grave markers or monuments and have had certain designs cut therein. There have been attempts to apply to the stone certain sections or portions thereof for the purpose of ornamentation. The White Patent No. 2,349,065 describes a method of applying a rosary or other objects to a stone surface. In this method it is suggested to form inclined anchor sockets to hold the molten material in position. U.S. patent to Wilcke, 667,898, discloses a method of ornamenting polished stone surfaces by an acid etching process wherein the acid is allowed to etch the stone to form an undercut at the edges of the depression so as to hold in position the artificial stone insert.

It is an object of the present invention to form in stone, color inserts which are a part thereof and natural thereto and permanent in nature.

It is another object of this invention to outline such inserts so as to form designs therein, which designs are held in position permanently as a part of the original stone or monument.

It is a still further object of the present invention to provide a process for the manufacture of a stone marker having a design therein which is permanent in nature.

These and other objects will be apparent from the following description and drawings, which are used for the purpose of illustration only and not as a limitation on the invention.

Figure 1:
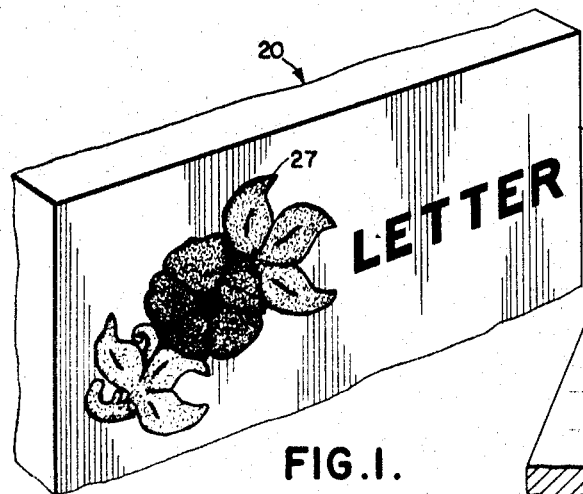
FIGURE 1 is a perspective view showing the finished stone marker.
Figure 2:
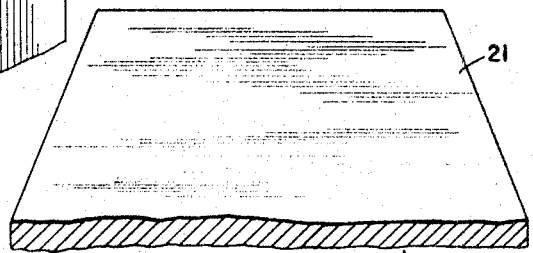
FIG. 2 is a perspective view of the stone marker showing the usual surface thereof.
Figure 3:
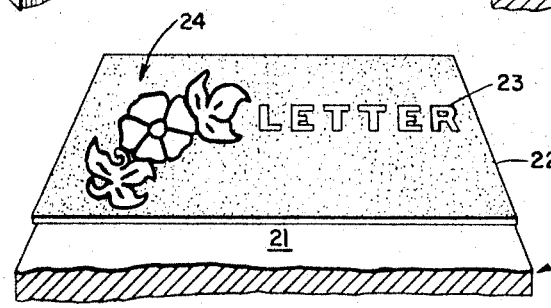
FIG. 3 is a perspective view showing the rubber stencil thereon.
Figure 4:
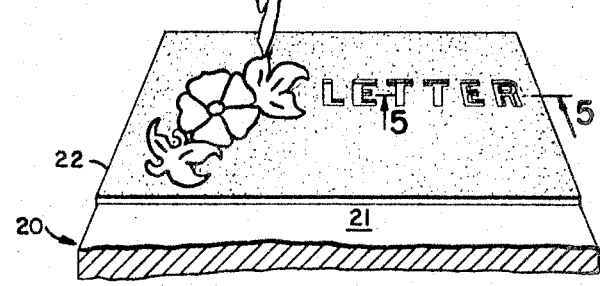
FIG. 4 is a perspective view showing the stone marker with the rubber stencil having the design cut therefrom.
Figure 5:
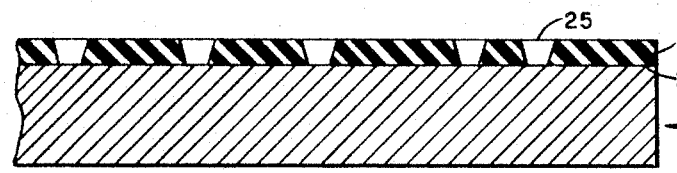
FIG. 5 is a sectional view on line 5—5 of FIG. 4.
Figure 6:
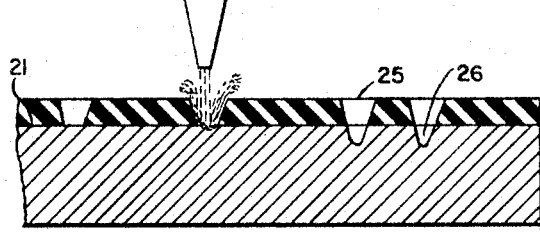
FIG. 6 is similar to FIG. 5, showing the sand blasting step.
Figure 7:
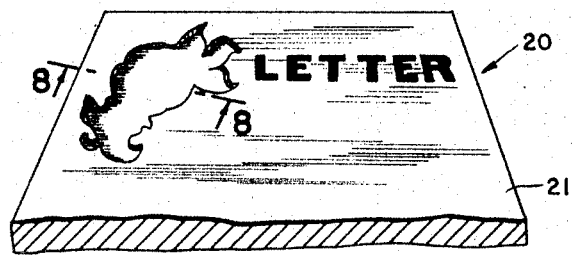
FIG. 7 is a perspective view showing the design after the sand blasting.
Figure 8:
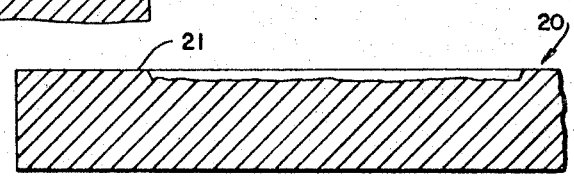
FIG. 8 is a sectional view on line 8—8 of FIG. 7.
Figure 9:
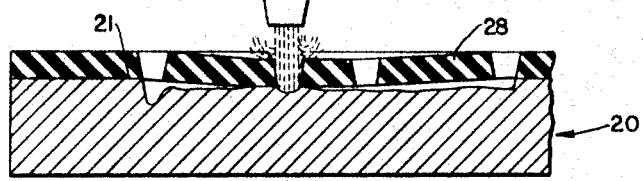
FIG. 9 is a sectional view showing the second sand blasting step.
Figure 10:
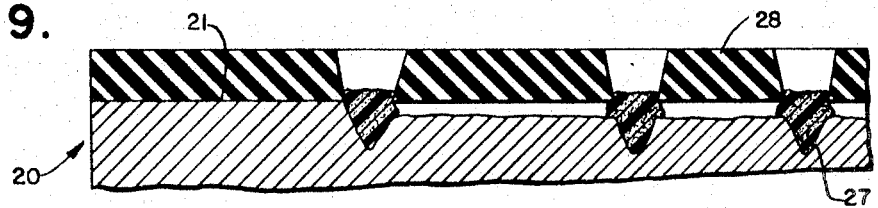
FIG. 10 is a view similar to FIG. 9, showing the first insert in the cutaway portion of the stone.
Figure 11:
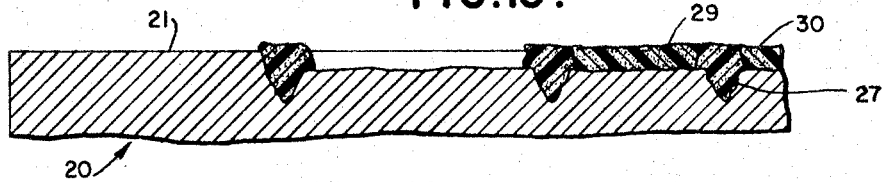
FIG. 11 is a view similar to FIG. 10 showing the second insert step in the stone.

Using the design shown in the drawings as an illustration of the invention, a stone marker 20, which may have either a polished or a wire-saw finish, has applied to the upper surface 21, a rubber stencil 22 having an outline of a series of letters 23 and a design 24, applied thereto with carbon markers, as shown in FIG. 3. The rubber stencil is then cut out as shown in FIG. 4 to remove therefrom a portion of the stencil to expose the stone surface 21 under the stencil. This exposes the stone surface 21 through the openings in the stencil to permit sand blasting to form the depressed surface 26 in the stone corresponding to the openings 25 in the stencil 22. That is, both the letters and the carved portion are cut as shown in FIGS. 6 and 7. This sand blasting may be of any depth desired, but a 1/8" depth is preferred, as shown in FIG. 8. The design portion of the stencil then has the cutout parts 28 of the stencil put back in place on the stone and a sand blast is again applied to form the dark outlined portion 27 of the design, as shown in FIG. 9. This is then filled with black granite dust, crushed stone or marble mixed with epoxy resin or other synthetic resin cohesive having a catalyst mixed therewith to promote the setting of the resin. This fills the lettered portion 25 of the stencil and the cutaway portion 26 of the stone as shown in FIG. 10, and after hardening the cut portion 28 of the stencil is removed from the design, as shown in FIG. 10, and after hardening the cut portion 28 of the stencil is removed from the design, as shown in FIG. 11.

Figure 12:
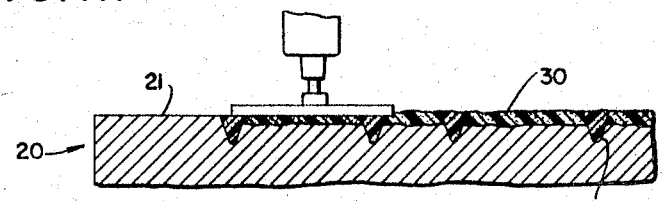
FIG. 12 is a view similar to FIG. 11, showing the polishing step in the process.
Figure 13:
FIG. 13 is a view similar to FIG. 12, showing the finished design.

In the design illustrated in the drawings, crushed green granite, marble or other stone mixed with epoxy resin is applied to those portions corresponding to the leaves 29 of the design between the dark outlined portion 27 thereof. Red colored crushed granite, marble or other stone is mixed with epoxy resin and is applied to that part of the design corresponding to the flower portion 30 of the design between the dark outlined parts 27. Finally, the whole stone surface is polished, as shown in FIG. 12 to give a smooth highly polished stone marker 20 having a surface 21 thereof with a design 27 thereon having lettered portion 23 set therein in black and having a central red rose portion therein, also outlined in black.

The final finish that may be applied to the entire stone surface may be a polishing to produce a sealed highly polished surface either by hand or by a mechanical honing. An alternative method of finishing the surface is to leave the surface in a "steeled finish" which is relatively smooth to the touch but not sealed or brushed to a high lustre, as happens when the surface is highly polished. When this surface is desired, the design employing the process which results in colored granite inserts would be lightly sand blased or shaped, resulting in the design being somewhat recessed into the surface of the base stone and the design area itself would be left in a sand blasted condition or finish much resembling in texture the basic granite.

While in the above example epoxy resin is used with a catalyst, other materials which will adhere to the cut-away portion in the granite or marble base may be used, but it is also essential that the inserts not only adhere to the stone base, but that they be retained within the stone base during variable changes in temperature and that the insert be weather proof to prevent absorption of moisture and the freezing thereof, which would cause the insert to loosen and eventually drop out of the depression. Portland cement does not give a waterproof material and due to weathering is quite easily removed. Portland cement inserts may not be polished as the insert will disintegrate.

Crushed stone having a particle size of one-eighth inch or less in diameter is added to epoxy resin or other resin cohesive in the proportion of one part of epoxy resin to three parts of stone by volume. Less stone may be used, but it is essential that there be enough resin to completely wet the surface of the stone. The catalyst to cause the polymerization of the epoxy resin is added after mixing with the crushed stone.

While in the above examples crushed black granite is used for the black outline and for the lettering, other natural stone may be used, or artificial pigment may be used in conjunction with the crushed stone and the epoxy resin, but naturally colored stone is preferred. Red and green granite also referred to in the examples, may also have a portion thereof substituted with other stone or with artificial pigment.

It is also necessary that the coefficient of expansion of the insert be so close to the coefficient of expansion of the stone base that the insert will not be loosened by changes in temperature.

In the above example naturally colored stone, such as crushed granite or marble of the red, green, black or other naturally colored stones are used to give contrasting colors to the design.

It will be apparent that while in the above example a red rose having green leaves with a black outline is shown, any other design may be used, such as lilies or different designs other than flowers, if desired.

While sand blasting is referred to in this specification, this term is intended to include any type of abrasives, such as Carborundum or even steel shot.

Figure 14:
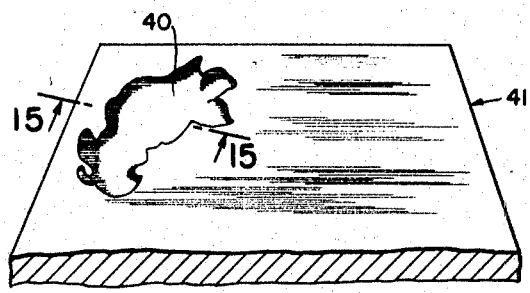
FIG. 14 is a first modification of a perspective view similar to FIG. 7, showing a stone base having a cutaway portion.
Figure 15:
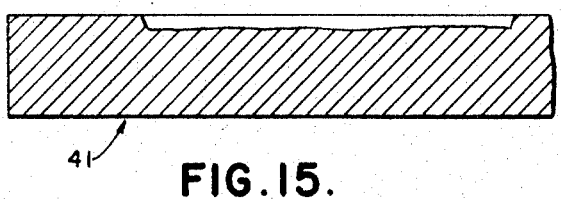
FIG. 15 is a sectional view on line 15—15 of FIG. 14.
Figure 16:
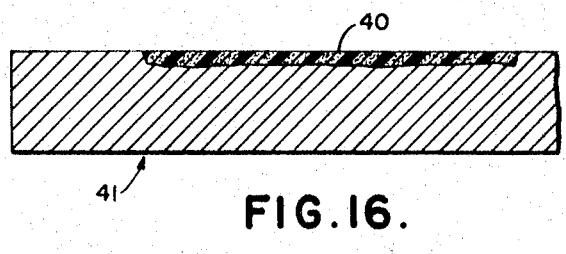
FIG. 16 is a view similar to FIG. 15 showing a stone insert therein.
Figure 17:
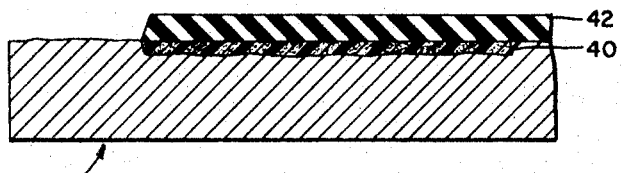
FIG. 17 is a view similar to FIG. 16 showing the rubber stencil preparatory to sand blasting.

A modification of the above process comprises the preparation of the basic stone 41, as shown in FIG. 14, the depression 40 in the stone 41 being filled with the desired mixture of crushed stone and epoxy resin as shown in FIG. 16, the stone contents of which being of a contrasting color from the base 41. This will not have the marginal dark outlined portions of the design, as shown in FIG. 9. After the insert has hardened, it is polished and a desired outline may be obtained thereon by replacing a rubber stencil 42 over the polished surface of the insert 40 having a cutaway portion, which would allow blasting to produce a whitened surface, which is especially effective in dark colored granite.

Figure 19:
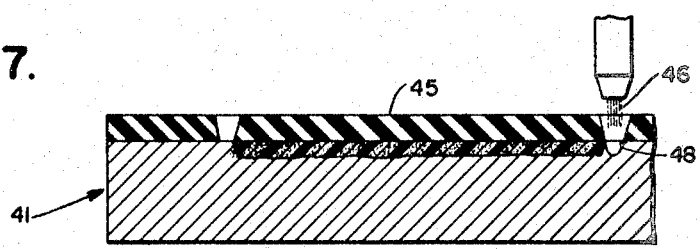
FIG. 19 is a view similar to FIG. 17 showing a second modification.
Figure 18:
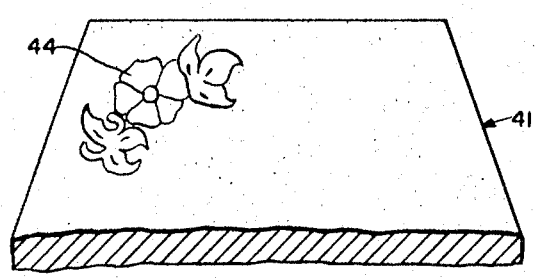
FIG. 18 shows the finished design.

A second modification is shown in FIGS. 18 and 19 wherein the design 44 after having been filled and polished has the rubber stencil 45 placed thereover and then the sand blast 46 is applied thereto so that the cut-away portions 48 in the rubber stencil 45 allow the sand blast to cut the surface of the stone base 41 below the level of the insert and the base. This gives a base relief effect to the design which is most effective when the design is of a color contrasting with the base.

In the above example, granite is referred to, this being the preferred material, as marble does not withstand weathering, but if the finished product is not to be exposed to the weather, marble may be used.

The colored stone used in the epoxy resin mixture is preferably granite of a contrasting color and even if a marble background is used, granite has been found to give the most effective and permanent inserts, as granite does not have a tendency to fade.

The advantages of the present invention are that a permanent natural decorative design or insignia in stone which may be used for graves or other purposes is obtained. The marker with its decorative insert will stand prolonged exposure to the weather without the absorption of water which causes the detachment of the design.

The use of two or more different colored inserts permit the formation of attractive decorative designs having the outlines thereof set off from the base material so as to form contrasts with the base and with the outline.

While in the above description and drawings an example is set forth for the purposes of illustration, this is not to be used as a limitation on the invention, which is only limited by the claim attached hereto.

What is claimed is:
1. A method for producing a decorative insert in a stone base, which comprises:
  (a) applying to the stone base a stencil,
  (b) outlining on the stencil the design,
  (c) removing from the stencil the design portion,
  (d) abrading the base to produce the impressions therein corresponding to the openings in the stencil,
  (e) replacing portions of the stencil leaving exposed the outline portions of the design and abrading the exposed portion of the stone,
  (f) filling the marginal abraded portions with contrasting insert, comprising crushed stone and synthetic cohesive polymer and allowing said insert to set,
  (g) removing all portions of the stencil and filling between the marginal portions with a mixture of crushed stone and synthetic cohesive polymer and allowing the same to set, and
  (h) finishing the entire surface of the stone base and the insert therein.

References Cited

UNITED STATES PATENTS

| | | | |
|---|---|---|---|
| 2,016,600 | 10/1935 | Gray | 117—38 X |
| 2,349,065 | 5/1944 | White | 161—8 X |
| 3,097,080 | 7/1963 | Weir | 264—162 X |

ALFRED L. LEAVITT, Primary Examiner

U.S. Cl. X.R.

117—37, 38; 161—5, 8, 413; 264—162, 245, 246